United States Patent
Yamaguchi et al.

(10) Patent No.: US 10,298,130 B2
(45) Date of Patent: *May 21, 2019

(54) SWITCHING REGULATOR

(71) Applicant: ROHM CO., LTD., Kyoto (JP)

(72) Inventors: Yuhei Yamaguchi, Kyoto (JP); Tetsuo Tateishi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 91 days.

This patent is subject to a terminal disclaimer.

(21) Appl. No.: 15/387,787

(22) Filed: Dec. 22, 2016

(65) Prior Publication Data
US 2017/0182894 A1 Jun. 29, 2017

(30) Foreign Application Priority Data
Dec. 28, 2015 (JP) .................. 2015-256559

(51) Int. Cl.
*B60L 11/18* (2006.01)
*H02M 3/158* (2006.01)
*H02M 1/00* (2006.01)

(52) U.S. Cl.
CPC .. *H02M 3/1582* (2013.01); *H02M 2001/0009* (2013.01)

(58) Field of Classification Search
CPC ..... B60L 11/1811; H02M 1/08; H02M 3/158; H02M 3/1582; H02M 2001/0009
USPC ...................................... 307/10.1
See application file for complete search history.

(56) References Cited

U.S. PATENT DOCUMENTS

| | | | | |
|---|---|---|---|---|
| 5,847,554 A | * | 12/1998 | Wilcox | H02M 3/1588 323/282 |
| 6,028,373 A | * | 2/2000 | Kim | H02M 1/36 307/130 |
| 6,034,514 A | * | 3/2000 | Sakai | H02M 3/1584 323/222 |
| 6,166,528 A | * | 12/2000 | Rossetti | H02M 3/1588 323/283 |
| 6,977,488 B1 | | 12/2005 | Nogawa et al. | |

(Continued)

FOREIGN PATENT DOCUMENTS

JP 3556652 5/2004

OTHER PUBLICATIONS

U.S. Patent and Trademark Office; Office Action mailed in corresponding U.S. Appl. No. 15/133,384 (dated Sep. 18, 2018).

*Primary Examiner* — Thienvu V Tran
*Assistant Examiner* — Brian K Baxter
(74) *Attorney, Agent, or Firm* — Fish & Richardson P.C.

(57) ABSTRACT

A switching regulator for generating an output voltage from an input voltage includes a first to fourth switches and is configured to fix an on-duty ratio of the third switch in a step-up/down mode. The switching regulator performs current mode control according to the information of current flowing through the second switch. A step-down control circuit includes a slope voltage generation part that generates a slope voltage, and generates a step-down control signal according to the slope voltage. The slope voltage generation part switches between a first operation of combining a first ramp voltage to stored information of the current to generate the slope voltage and a second operation of combining a second ramp voltage having a slope smaller than a slope of the first ramp voltage to stored information of the current to generate the slope voltage.

12 Claims, 20 Drawing Sheets

(56) References Cited

U.S. PATENT DOCUMENTS

| | | | | |
|---|---|---|---|---|
| 2007/0273340 A1* | 11/2007 | Miller | ................ | H02M 3/1582 |
| | | | | 323/224 |
| 2009/0302816 A1* | 12/2009 | Kunimatsu | ............ | H02M 1/36 |
| | | | | 323/282 |
| 2010/0066333 A1* | 3/2010 | Noda | ................... | H02M 3/156 |
| | | | | 323/282 |
| 2010/0244801 A1* | 9/2010 | Arora | ................. | H02M 3/1563 |
| | | | | 323/284 |
| 2011/0043172 A1* | 2/2011 | Dearn | ................ | H02M 3/1582 |
| | | | | 323/259 |
| 2012/0032658 A1* | 2/2012 | Casey | ................ | H02M 3/1582 |
| | | | | 323/271 |
| 2012/0038341 A1* | 2/2012 | Michishita | ............ | H02M 3/156 |
| | | | | 323/284 |
| 2014/0167714 A1* | 6/2014 | Wei | ........................ | H02M 1/36 |
| | | | | 323/266 |
| 2014/0354250 A1 | 12/2014 | Deng | | |
| 2016/0373009 A1* | 12/2016 | Tateishi | ............... | H02M 3/156 |
| 2017/0187278 A1* | 6/2017 | Yamaguchi | ........... | H02M 1/088 |
| 2017/0237271 A1 | 8/2017 | Kelly-Morgan et al. | | |

\* cited by examiner

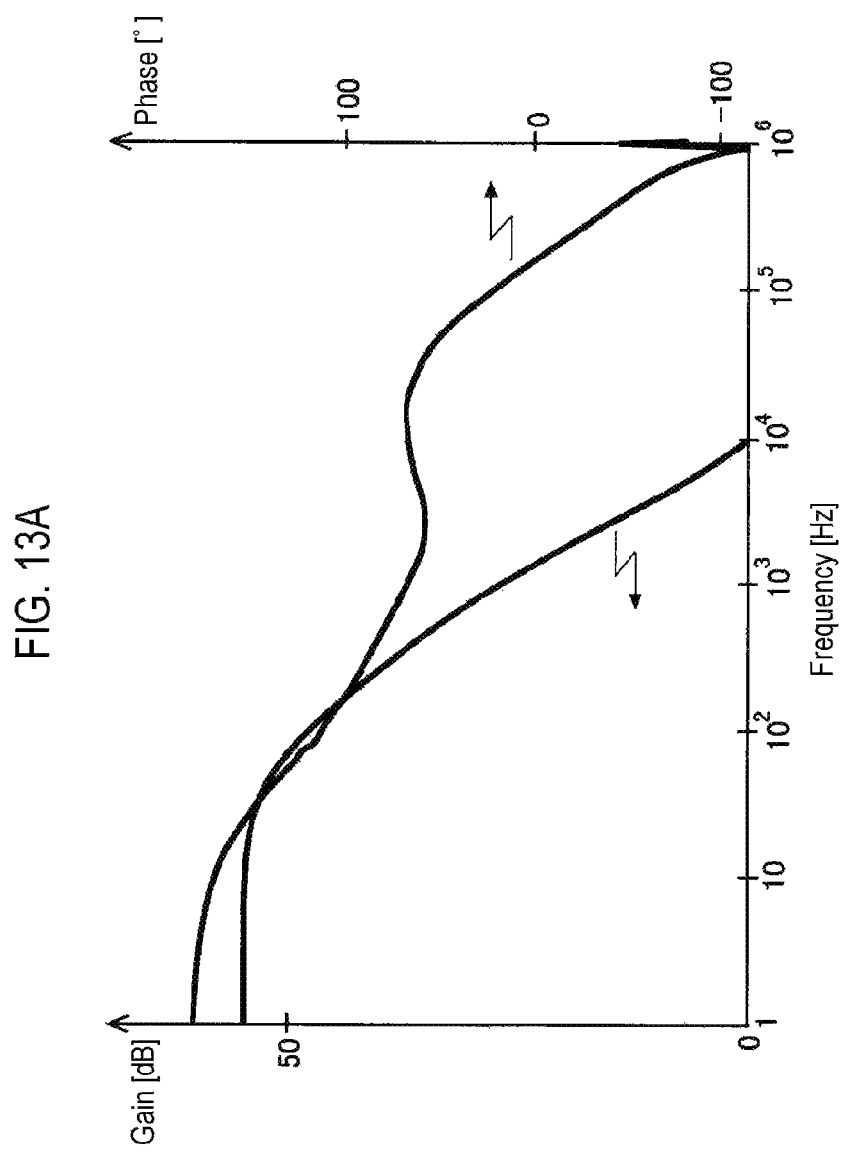

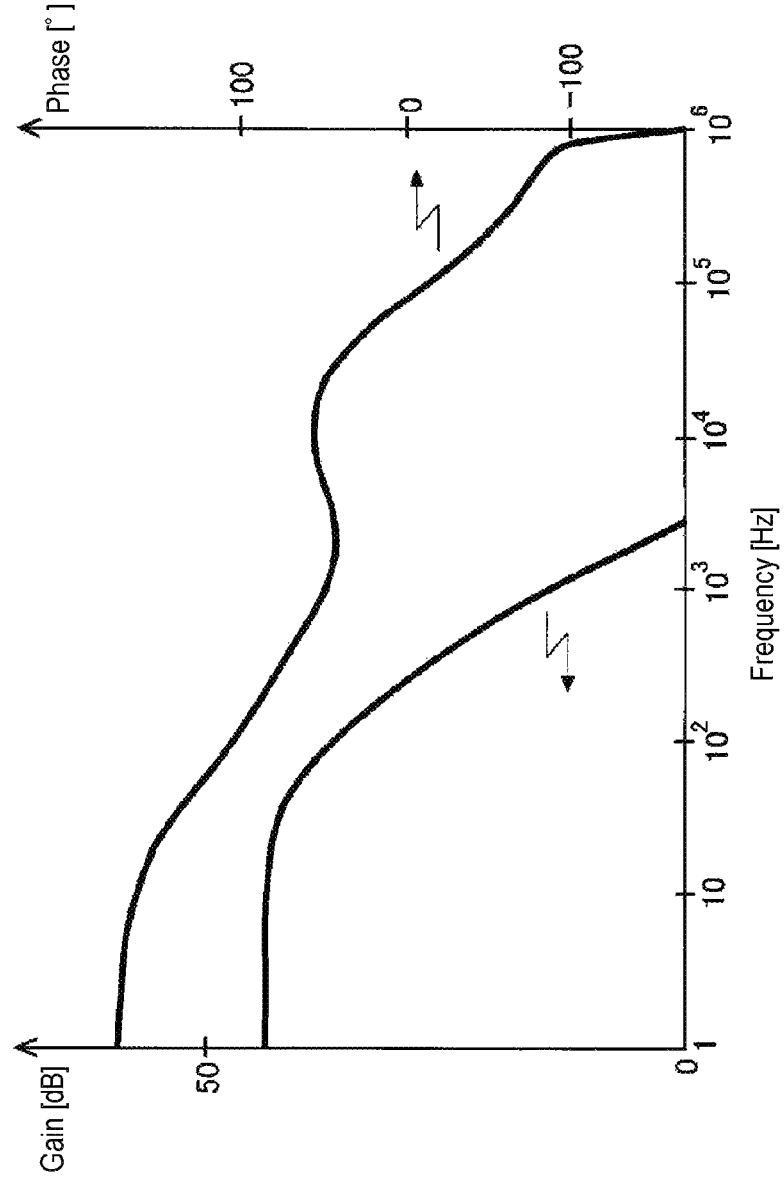

SWITCHING REGULATOR

CROSS-REFERENCE TO RELATED APPLICATION(S)

This application is based upon and claims the benefit of priority from Japanese Patent Application No. 2015-256559, filed on Dec. 28, 2015, the entire contents of which are incorporated herein by reference.

TECHNICAL FIELD

The present disclosure relates to a step-up/down switching regulator.

BACKGROUND

In an idling stopped vehicle which restarts an engine many times, since power of a battery is consumed by in-vehicle equipment such as an AV system, an air conditioner, etc. during a period of temporarily stoppage of the engine, battery voltage drop during cranking (engine starting) becomes stricter than before. By using a step-up/down switching regulator which holds an output voltage when an input voltage (battery voltage) drops, the in-vehicle equipment can be normally operated even when the battery voltage drops greatly during the cranking.

For this reason, the demand for step-up/down switching regulators is increasing in the in-vehicle equipment market.

The configuration and operation of a typical step-up/down switching regulator will be described below. FIG. 15 is a diagram illustrating the configuration of a typical step-up/down switching regulator.

The step-up/down switching regulator shown in FIG. 15 includes MOS transistors Q11 and Q12, which are step-down switches, an inductor L11, MOS transistors Q13 and Q14, which are step-up switches, an output capacitor C11, resistors R11 to R14 and a control part CNT11.

The control part CNT11 monitors an output voltage $V_{OUT}$ by an output of a voltage dividing circuit configured with the resistors R11 and R12 and monitors a battery voltage $V_{BAT}$, which is an input voltage, by an output of a voltage dividing circuit configured with the resistors R13 and R14.

When the battery voltage $V_{BAT}$ is larger than a first predetermined value A1, the control part CNT11 selects a step-down mode (see FIG. 16). In the step-down mode, the control part CNT11 turns on/off the MOS transistors Q11 and Q12 in response to the output voltage $V_{OUT}$, always turns off the MOS transistor Q13, and always turns on the MOS transistor Q14. As a result, a first switch voltage $V_{SW1}$, which is a voltage of a connection node between the MOS transistors Q11 and Q12, and a second switch voltage $V_{SW2}$, which is a voltage of a connection node between the MOS transistors Q13 and Q14, give an output as shown in FIG. 17A.

When the battery voltage $V_{BAT}$ is equal to or smaller than the first predetermined value A1 and is larger than a second predetermined value A2, the control part CNT11 selects a step-up/down mode (see FIG. 16). In the step-up/down mode, the control part CNT11 turns on/off the MOS transistors Q11 and Q12 in response to the output voltage $V_{OUT}$ and turns on/off the MOS transistors Q13 and Q14 in response to the output voltage $V_{OUT}$. As a result, the first switch voltage $V_{SW1}$, which is the voltage of the connection node between the MOS transistors Q11 and Q12, and the second switch voltage $V_{SW2}$, which is the voltage of the connection node between the MOS transistors Q13 and Q14, give an output as shown in FIG. 17B.

When the battery voltage $V_{BAT}$ is equal to or smaller than the second predetermined value A2, the control part CNT11 selects a step-up mode (see FIG. 16). In the step-up mode, the control part CNT11 always turns on the MOS transistor Q11, always turns off the MOS transistor Q12, and turns on/off the MOS transistors Q13 and Q14 in response to the output voltage $V_{OUT}$. As a result, the first switch voltage $V_{SW1}$, which is the voltage of the connection node between the MOS transistors Q11 and Q12, and the second switch voltage $V_{SW2}$, which is the voltage of the connection node between the MOS transistors Q13 and Q14, give an output as shown in FIG. 17C.

An average current of the inductor L11 in the step-up/down mode and the step-up mode is larger than that in the step-down mode. For this reason, heat generation in the step-up/down mode and the step-up mode is greater than that in the step-down mode, which results in poor efficiency. Therefore, it is desirable to switch between the step-down mode to the step-up/down mode as little as possible even when the battery voltage $V_{BAT}$ is lowered. That is, it is desirable to set the first predetermined value A1 to be as small as possible within a range in which a desired output voltage $V_{OUT}$ is obtained.

However, in the step-up/down switching regulator shown in FIG. 15, a switching frequency of the MOS transistors Q11 and Q12 is a constant value in the step-down mode, thereby limiting the maximum on-duty ratio of the MOS transistor Q11. In addition, the first predetermined value A1 cannot be sufficiently lowered because of the limited maximum on-duty ratio.

A conventional DC-DC converter also has the same problems as the step-up/down switching regulator shown in FIG. 15.

SUMMARY

The present disclosure provides some embodiments of a step-up/down switching regulator which is capable of preventing the switching from a step-down mode to a step-up/down mode when an input voltage drops.

According to one embodiment of the present disclosure, there is provided a switching regulator for generating an output voltage from an input voltage, including: a first switch having a first terminal connected to a first application terminal to which the input voltage is applied; a second switch having a first terminal connected to a second terminal of the first switch and a second terminal connected to a second application terminal to which a predetermined voltage lower than the input voltage is applied; a current detection part configured to detect a current flowing through the second switch; an inductor having a first terminal connected to a connection node between the first switch and the second switch; a third switch having a first terminal connected to a second terminal of the inductor and a second terminal connected to a third application terminal to which the predetermined voltage is applied; a fourth switch having a first terminal connected to a connection node between the inductor and the third switch and a second terminal connected to a fourth application terminal to which the output voltage is applied; a first control circuit configured to generate a step-down control signal to turn on/off the first switch and the second switch complementarily in response to the output voltage; and a second control circuit configured to fix the on-duty ratio (D (0≤D≤1)) of the third switch at a fixed value (D' (0<D'<1)) in a step-up/down mode and generate a step-up control signal to turn on/off the third switch and the fourth switch complementarily. The first control circuit includes a slope voltage generation part to generate a slope voltage and generates the step-down control signal in response to the slope voltage. The slope voltage generation part switches between a first operation of storing information of the current detected by the current detection part and combining a first ramp voltage to the stored information of the current to generate the slope voltage and a second operation of storing information of the current detected by the current detection part and combining a second ramp voltage having a slope smaller than a slope of the first ramp voltage, in addition to or instead of the first ramp voltage, to the stored information of the current to generate the slope voltage.

The first control circuit may include: an error amplifier which generates an error signal based on a difference between a voltage according to the output voltage of the switching regulator and a reference voltage; a comparator which compares the slope signal and the error signal to generate a reset signal which is a comparison signal; an oscillator which generates a set signal which is a clock signal having a predetermined frequency; and a timing control circuit which generates the step-down control signal in response to the set signal and the reset signal.

The first switch may be switched from an off state to an on state by the step-down control signal when the set signal is switched from a high level to a low level, and the slope voltage generation part may select one of the first operation and the second operation depending on a state of the step-down control signal when the set signal is switched from the low level to the high level.

The current detection part may be a voltage-current conversion circuit which converts a voltage according to the current flowing through the second switch into a current, and the slope voltage generation part may include a first capacitor which is charged with an output current of the voltage-current conversion circuit.

The slope voltage generation part may further include a first switch which connects/disconnects a current path extending from an output terminal of the voltage-current conversion circuit to the first capacitor.

The slope voltage generation part may include a first reset part which resets a charging voltage of the first capacitor by discharging the first capacitor.

The slope voltage generation part may include: a first constant current source; and a second capacitor which is charged with an output current of the first constant current source.

The slope voltage generation part may include a second reset part which resets a charging voltage of the second capacitor by discharging the second capacitor.

The slope voltage generation part may include a variable resistor part having on-resistance controlled by the charging voltage of the first capacitor, and the variable resistor part may be connected in series to the second capacitor.

The slope voltage generation part may include: a second constant current source; and a second switch which connects/disconnects a current path extending from an output terminal of the second constant current source to the first capacitor, and an output current of the second constant current source may be smaller than the output current of the first constant current source.

According to another embodiment of the present disclosure, there is provided a switching regulator for generating an output voltage from an input voltage, including: a first switch having a first terminal connected to a first application terminal to which the input voltage is applied; a second switch having a first terminal connected to a second terminal of the first switch and a second terminal connected to a second application terminal to which a predetermined voltage lower than the input voltage is applied; a current detection part configured to detect a current flowing through the second switch; an inductor having a first terminal connected to a connection node between the first switch and the second switch; a third switch having a first terminal connected to a second terminal of the inductor and a second terminal connected to a third application terminal to which the predetermined voltage is applied; a fourth switch having a first terminal connected to a connection node between the inductor and the third switch and a second terminal connected to a fourth application terminal to which the output voltage is applied; a first control circuit configured to generate a step-down control signal to turn on/off the first switch and the second switch complementarily in response to the output voltage; and a second control circuit configured to set the on-duty ratio of the third switch independent of the output voltage and the input voltage in a step-up/down mode and generate a step-up control signal to turn on/off the third switch and the fourth switch complementarily. The first control circuit includes a slope voltage generation part to generate a slope voltage and generates the step-down control signal in response to the slope voltage. The slope voltage generation part switches between a first operation of storing information of the current detected by the current detection part and combining a first ramp voltage to the stored information of the current to generate the slope voltage and a second operation of storing information of the current detected by the current detection part and combining a second ramp voltage having a slope smaller than a slope of the first ramp voltage, in addition to or instead of the first ramp voltage, to the stored information of the current to generate the slope voltage.

According to another embodiment of the present disclosure, there is provided a vehicle including: the above-described switching regulator; and a battery which supplies power to the switching regulator.

BRIEF DESCRIPTION OF THE DRAWINGS

FIG. 13A is a bode diagram of a step-down mode.

FIG. 13B is a bode diagram of a step-up/down mode.

DETAILED DESCRIPTION

<Overall Configuration>

Figure 1:
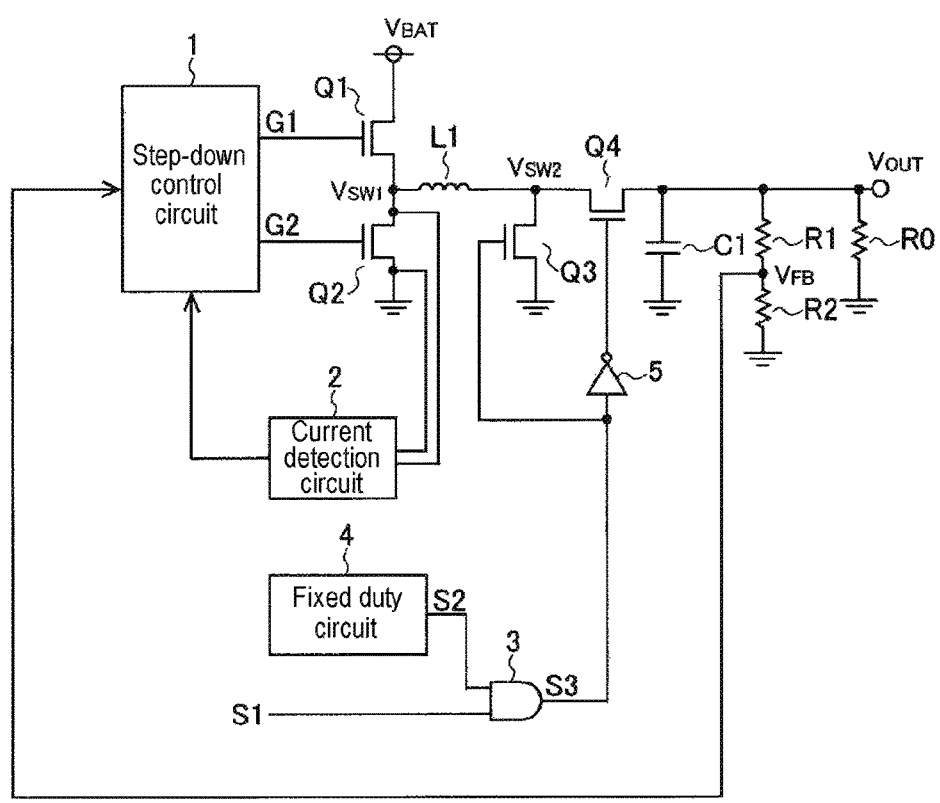
FIG. 1 is a diagram illustrating an overall configuration example of a switching regulator.

FIG. 1 is a diagram illustrating an overall configuration example of a switching regulator. A switching regulator 101 of this configuration example is a step-up/down switching regulator and includes a step-down control circuit 1, MOS transistors Q1 to Q4, an inductor L1, an output capacitor C1, an output resistor RO, voltage dividing resistors R1 and R2, a current detection circuit 2, an AND gate 3, a fixed duty circuit 4 and a NOT gate 5.

The MOS transistor Q1 is an N-channel MOS transistor and is one example of a switch which connects/disconnects a current path extending from an input voltage application terminal to which a battery voltage $V_{BAT}$ as an input voltage is applied to one end of the inductor L1. The drain of the MOS transistor Q1 is connected to the input voltage application terminal to which the battery voltage $V_{BAT}$ is applied. The source of the MOS transistor Q1 is connected to the end of the inductor L1 and the drain of the MOS transistor Q2.

The MOS transistor Q2 is an N-channel MOS transistor and is one example of a switch which connects/disconnects a current path extending from a ground terminal to the one end of the inductor L1. The drain of the MOS transistor Q2 is connected to the input voltage application terminal and the source of the MOS transistor Q1, as described above. The source of the MOS transistor Q2 is connected to the ground terminal. The MOS transistor Q2 may be replaced with a diode.

The MOS transistor Q3 is an N-channel MOS transistor and is one example of a switch which connects/disconnects a current path extending from the other end of the inductor L1 to the ground terminal. The drain of the MOS transistor Q3 is connected to the other end of the inductor L1. The source of the MOS transistor Q3 is connected to the ground terminal.

The MOS transistor Q4 is an N-channel MOS transistor and is one example of a switch which connects/disconnects a current path extending from the other end of the inductor L1 to an output voltage application terminal to which an output voltage $V_{OUT}$ is applied. The drain of the MOS transistor Q4 is connected to the other end of the inductor L1 and the drain of the MOS transistor Q3. The source of the MOS transistor Q4 is connected to one end of the output capacitor C1 and the output voltage application terminal to which the output voltage $V_{OUT}$ is applied. The MOS transistor Q4 may be replaced with a diode.

The output capacitor C1 is a smoothing capacitor for reducing a ripple of the output voltage $V_{OUT}$. The phase of the output voltage $V_{OUT}$ is compensated by a phase compensation circuit configured with the output capacitor C1 and the resistor RO.

The voltage dividing resistors R1 and R2 divide the output voltage $V_{OUT}$ to generate a feedback voltage $V_{FB}$ which is then supplied to the step-down control circuit 1.

The step-down control circuit 1 generates a gate signal G1 of the MOS transistor Q1 and a gate signal G2 of the MOS transistor Q2 for turning on/off the MOS transistors Q1 and Q2 complementarily in response to the feedback voltage $V_{FB}$, and supplies the generated gate signals G1 and G2 to the gates of the MOS transistors Q1 and Q2, respectively. It may be preferable to provide a dead time at which both of the MOS transistors Q1 and Q2 are turned off when an on/off state of the MOS transistors Q1 and Q2 is switched.

The current detection circuit 2 detects a current flowing through the MOS transistor Q2 based on a drain-source voltage, i.e., a voltage across the on-resistance of the MOS transistor Q2 in an on state of the MOS transistor Q2, and outputs a result of the detection to the step-down control circuit 1.

The AND gate 3 outputs a signal S3 which corresponds to a logical product of a mode designating signal S1 and a pulse signal S2 having a fixed on-duty ratio, which is output from the fixed duty circuit 4. The mode designating signal S1 is a signal designating a step-down mode when this signal has a low level and a step-up/down mode when this signal has a high level. The switching regulator 101 may be configured such that a circuit (not shown) generating the mode designating signal S1 is built therein or configured to receive the mode designating signal S1 from the outside.

The output signal S3 of the AND gate 3 is supplied to the gate of the MOS transistor Q3 and is then supplied to the gate of the MOS transistor Q4 after being logically inverted by the NOT gate 5. It may be preferable to use a dead time generation circuit, instead of the NOT gate 5, to provide a dead time at which both of the MOS transistors Q3 and Q4 are turned off when an on/off state of the MOS transistors Q3 and Q4 is switched.

<Configuration Example of Step-Down Control Circuit>

Figure 2A:
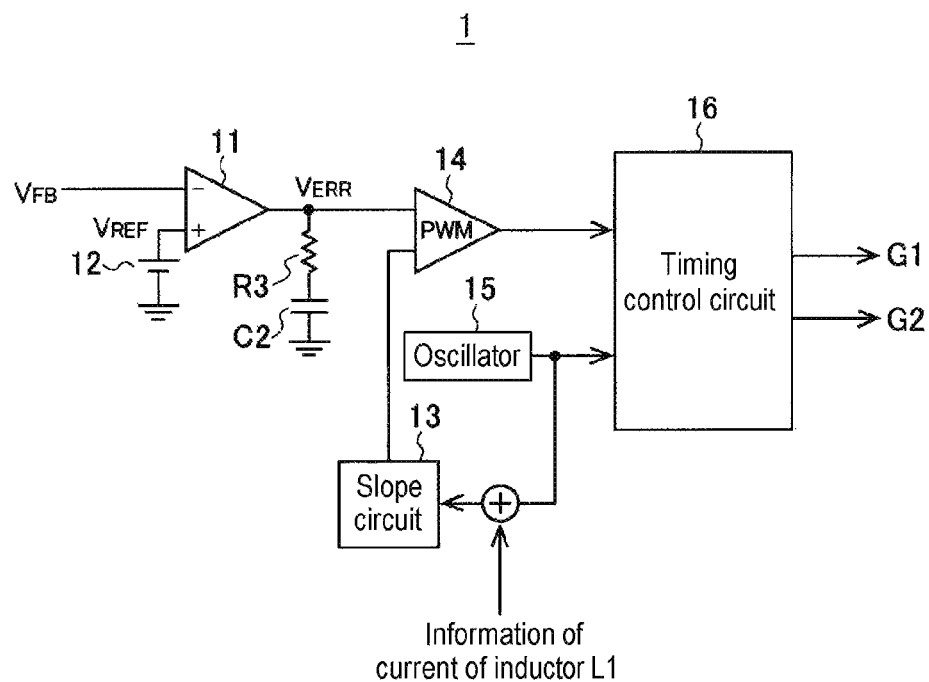
FIG. 2A is a diagram illustrating one configuration example of a step-down control circuit.

FIG. 2A is a diagram illustrating one configuration example of the step-down control circuit 1. In the example shown in FIG. 2A, the step-down control circuit 1 includes an error amplifier 11, a reference voltage source 12, a resistor R3, a capacitor C2, a slope circuit 13, a comparator 14, an oscillator 15 and a timing control circuit 16.

The error amplifier 11 generates an error signal corresponding to a difference between the feedback signal $V_{FB}$ and a reference voltage $V_{REF}$ output from the reference voltage source 12. The phase of the error signal is compensated by a phase compensation circuit configured with the resistor R3 and the capacitor C2.

The slope circuit 13 is controlled based on a clock signal of a predetermined frequency output from the oscillator 15. The slope circuit 13 has current information of the inductor L1 by receiving an output of the current detection circuit 2 (see FIG. 1) and generates and outputs a slope voltage in which the current information of the inductor L1 is reflected.

Thus, the switching regulator 101 is a so-called current mode controlled switching regulator.

The comparator 14 compares the phase-compensated error signal with the output voltage of the slope circuit 13, and generates a reset signal as a comparison signal based on a result of the comparison. Since the slope signal generated by the slope circuit 13 has a fixed period, the reset signal is a PWM signal.

The oscillator 15 outputs the clock signal of the predetermined frequency to the slope circuit 13, as described above, and at the same time outputs the clock signal of the predetermined frequency to the timing control circuit 16.

The timing control circuit 16 switches the gate signal G1 from a low level to a high level when a set signal (the clock signal output from the oscillator 15) is switched from a high level to a low level, and switches the gate signal G1 from the high level to the low level when a reset signal is switched from the low level to the high level.

Figure 2B:
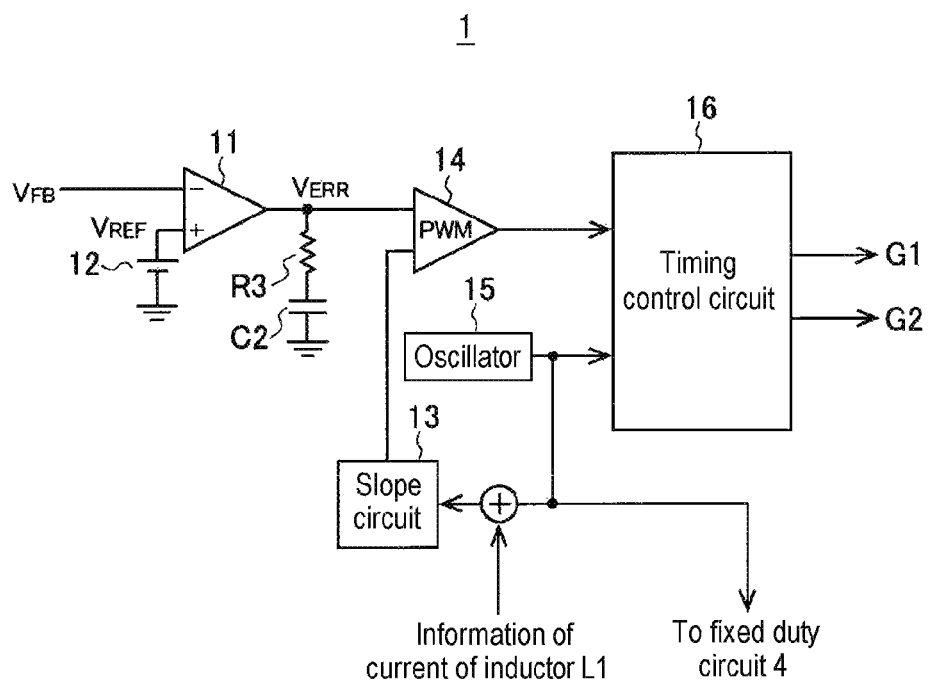
FIG. 2B is a diagram illustrating another configuration example of the step-down control circuit.

FIG. 2B is a diagram illustrating another configuration example of the step-down control circuit 1. In the example shown in FIG. 2B, the oscillator 15 outputs the clock signal of the predetermined frequency to the fixed duty circuit 4 in addition to the slope circuit 13 and the timing control circuit 16. In this case, the fixed duty circuit 4 generates the pulse signal S2 based on the clock signal of the predetermined frequency output from the oscillator 15. In contrast, in the above-described example of FIG. 2A, the fixed duty circuit 4 is configured to include an oscillator which is separate from the step-down control circuit 1.

<Example of Generation of Slope Voltage>

Figure 3:
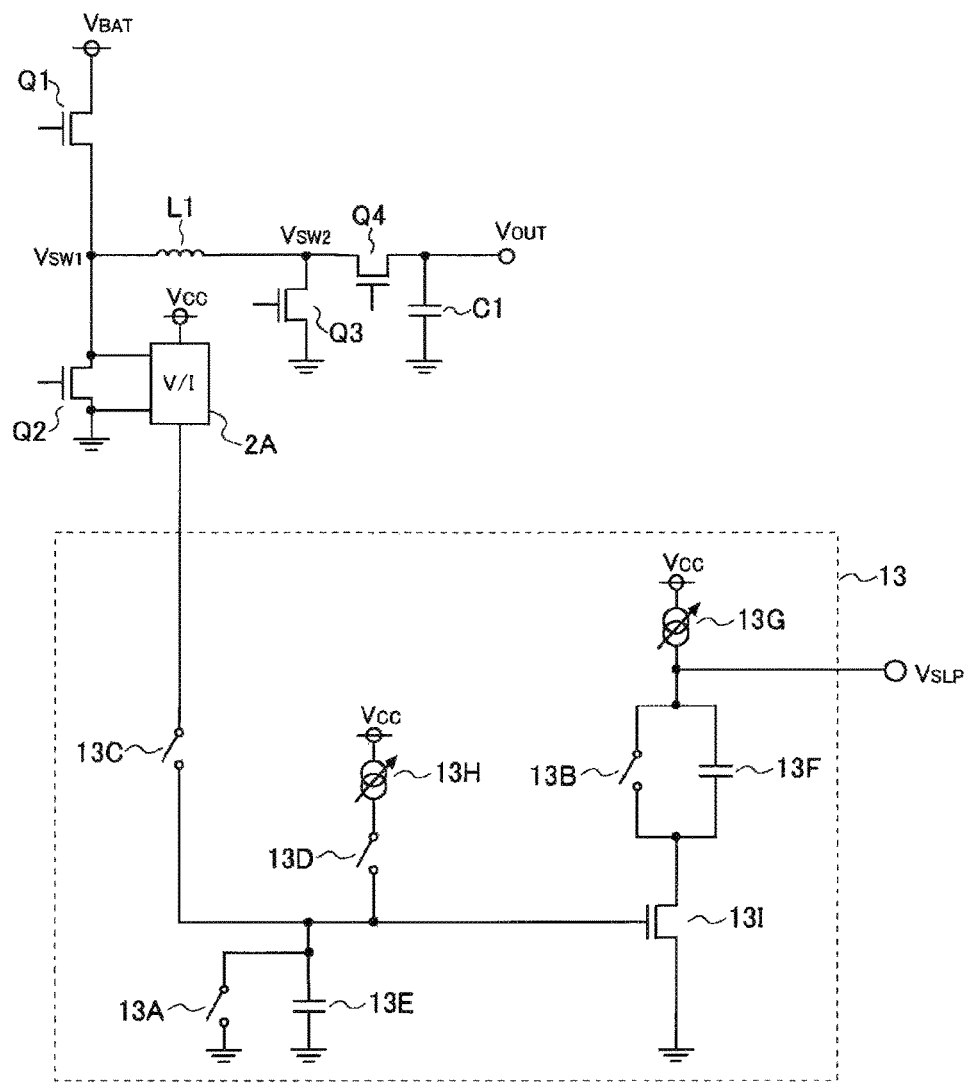
FIG. 3 is a diagram illustrating one configuration example of a current detection circuit and a slope circuit.

FIG. 3 is a diagram illustrating one configuration example of the current detection circuit 2 and the slope circuit 13. In the example shown in FIG. 3, the current detection circuit 2 is constituted by a voltage-current conversion circuit 2A. In addition, in the example shown in FIG. 3, the slope circuit 13 is constituted by switches 13A to 13D, capacitors 13E and 13F, constant current sources 13G and 13H, and an NMOS transistor 131. A gate-source voltage of the NMOS transistor 131 is a voltage across the capacitor 13E, and the drain of the NMOS transistor 131 is connected to a parallel circuit configured with the switch 13B and the capacitor 13F. In addition, it may be desirable that a value of constant current output from each of the constant current sources 13D and 13H can be adjusted.

The voltage-current conversion circuit 2A and the constant current sources 13G and 13H are driven by an internal power supply voltage $V_{CC}$ generated in the step-down control circuit 1 which is an IC (Integrated Circuit).

The voltage-current conversion circuit 2A converts the drain-source voltage of the MOS transistor Q2 into a current. The capacitor 13E is charged with an output current of the voltage-current conversion circuit 2A when the switch 13C is switched on, charged with an output current of the constant current source 13H when the switch 13D is switched on, and refreshed when the switch 13A is switched on. The capacitor 13F is charged with an output current of the constant current source 13G when the switch 13B is switched off and the NMOS transistor 131 is turned on, and refreshed when the switch 13B is switched on. A voltage of a connection node between the capacitor 13F and the constant current source 13G corresponds to a slope voltage $V_{SLP}$.

Figure 4:
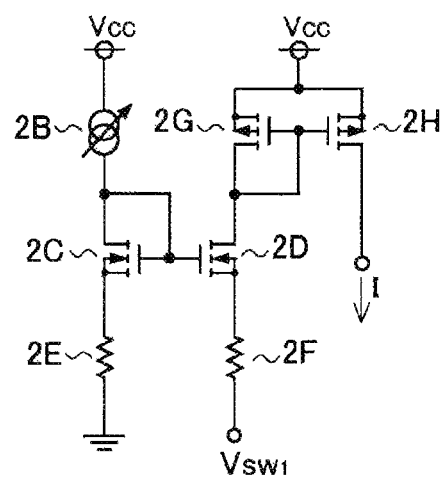
FIG. 4 is a diagram illustrating one configuration example of a voltage-current conversion circuit.

FIG. 4 is a diagram illustrating one configuration example of the voltage-current conversion circuit 2A. In the voltage-current conversion circuit shown in FIG. 4, a current source 2B supplies a current to a current mirror circuit constituted by N-channel MOS transistors 2C and 2D. When the mirror ratio of the current mirror circuit constituted by N-channel MOS transistors 2C and 2D is 1:1, a current flowing through a resistor 2F has a value obtained by dividing a first switch voltage $V_{SW1}$ by a difference $(R_{2E}-R_{2F})$ between the resistance $R_{2E}$ of a resistor 2E and the resistance $R_{2F}$ of the resistor 2F. Then, a current (current corresponding to the first switch voltage $V_{SW1}$ which is an input voltage of the voltage-current conversion circuit 2A) corresponding to the current flowing through the resistor 2F is swept out, as an output current of the voltage-current conversion circuit 2A, by a current mirror circuit constituted by P-channel MOS transistors 2G and 2H.

Figure 5:
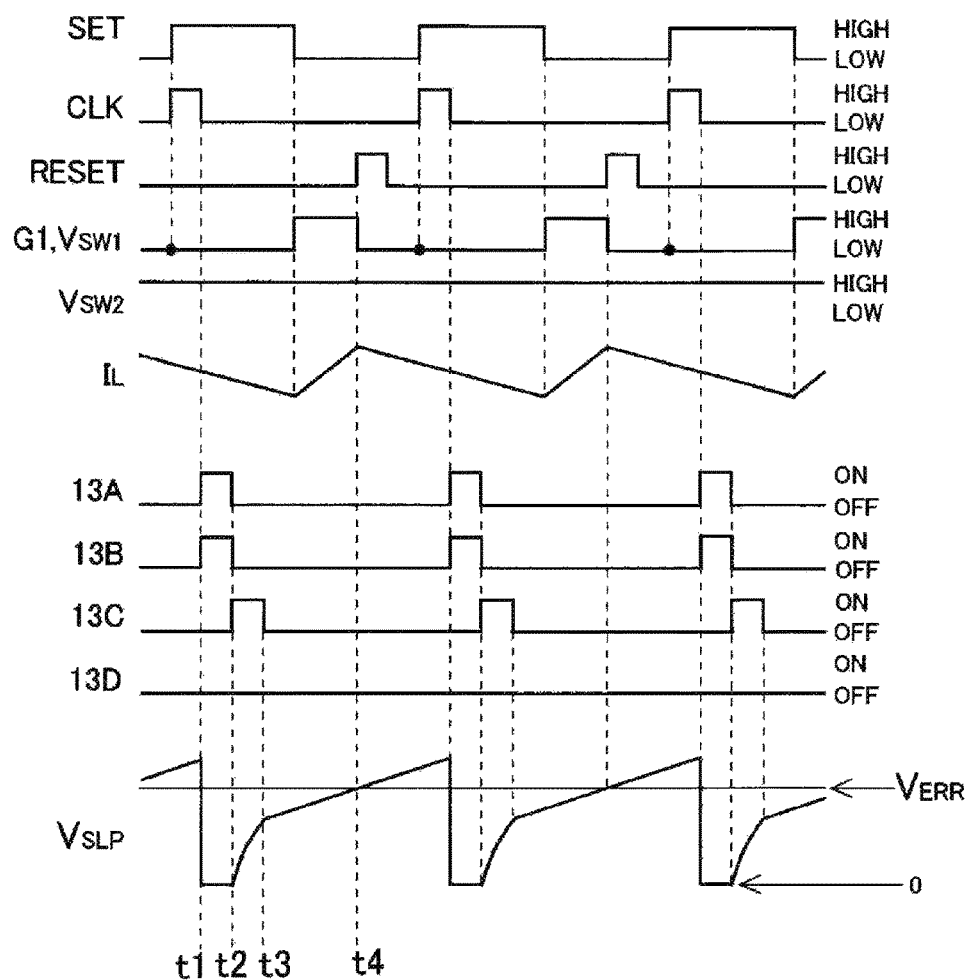
FIG. 5 is a time chart illustrating one operation example of the switching regulator of FIG. 1 in a step-down mode in a case where a battery voltage is high.
Figure 6:
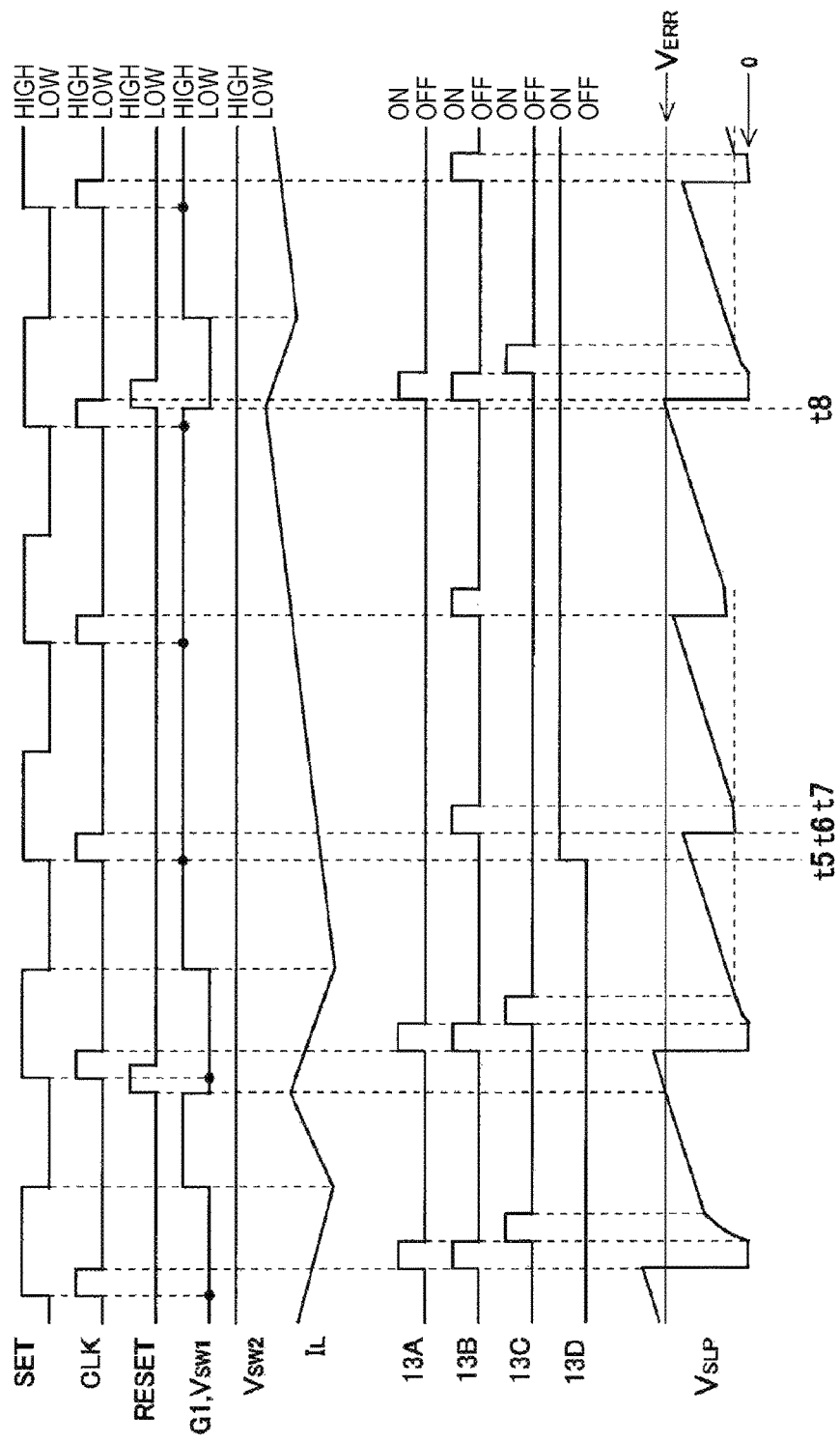
FIG. 6 is a time chart illustrating one operation example of the switching regulator of FIG. 1 in the step-down mode in a case where the battery voltage is low.
Figure 7:
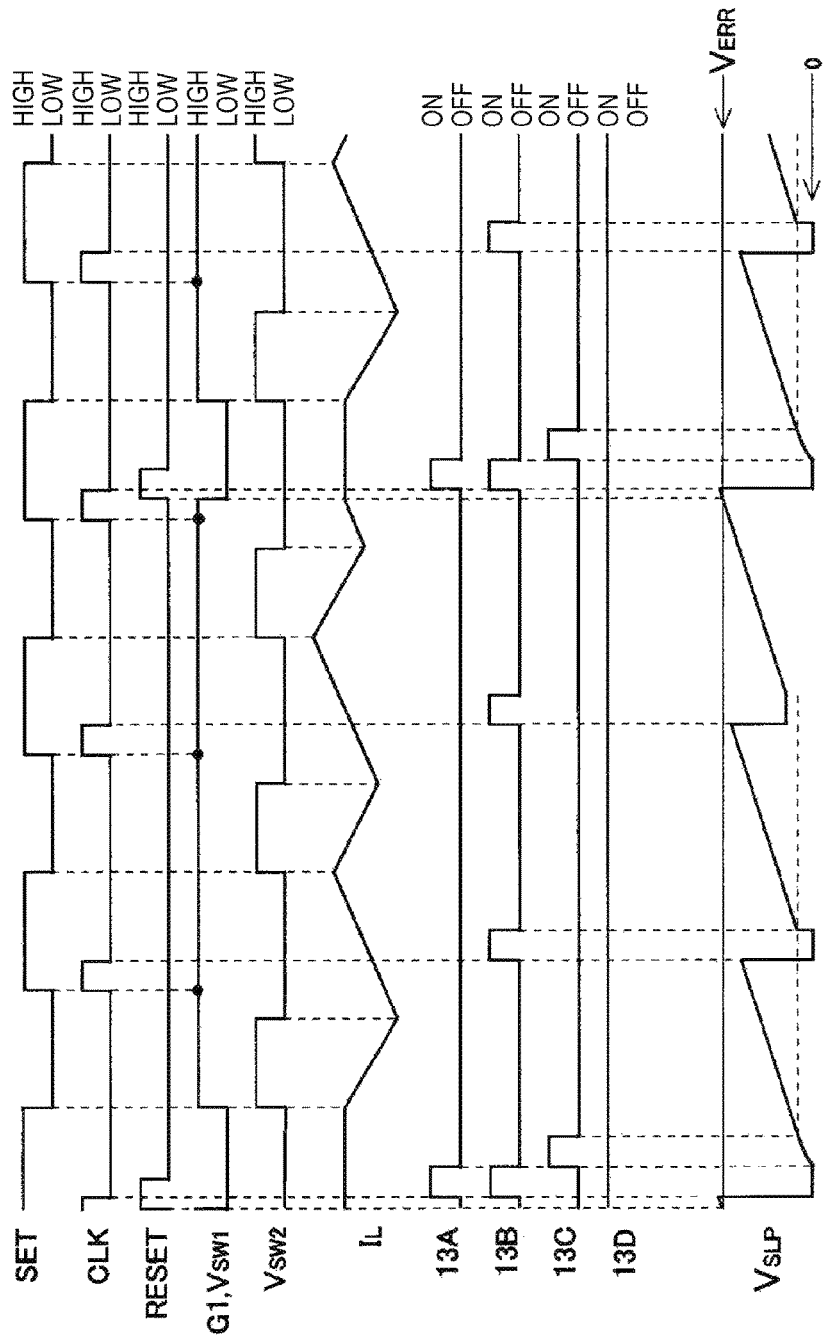
FIG. 7 is a time chart illustrating one operation example of the switching regulator of FIG. 1 in a step-up/down mode.

FIG. 5 is a time chart illustrating one operation example of the switching regulator of FIG. 1 in a step-down mode in a case where the battery voltage $V_{BAT}$ as the input voltage is high. FIG. 6 is a time chart illustrating one operation example of the switching regulator of FIG. 1 in the step-down mode in a case where the battery voltage $V_{BAT}$ as the input voltage is low. FIG. 7 is a time chart illustrating one operation example of the switching regulator of FIG. 1 in a step-up/down mode.

In the examples shown in FIGS. 5 to 7, the timing control circuit 16 switches the gate signal G1 from a low level to a high level when a set signal SET is switched from a high level to a low level, and switches the gate signal G1 from the high level to the low level when a reset signal RESET is switched from the low level to the high level.

In addition, based on the set signal SET, the timing control circuit 16 generates an internal clock signal CLK which is switched from a low level to a high level at the time of switching of the set signal SET from the low level to the high level and has a period of high level shorter than that of high level of the set signal SET.

The slope circuit 13 switches on/off the switches 13A to 13D according to an instruction from the timing control circuit 16. The timing control circuit 16 changes the contents of instruction to the slope circuit 13 according to a level of the gate signal G1 at the time of switching of the set signal SET from the low level to the high level.

First, a case where the gate signal G1 has the low level at the time of switching of the set signal SET from the low level to the high level will be described with reference to FIG. 5.

At the time of switching of the internal clock signal CLK from the high level to the low level (at a timing t1), the slope circuit 13 switches the switches 13A and 13B from an off state to an on state and keeps the switches 13C and 13D off. Thus, the capacitors 13E and 13F are refreshed and the slope voltage $V_{SLP}$ becomes zero.

Then, when a predetermined period of time elapses from the timing of t1 (at a timing of t2), the slope circuit 13 switches the switches 13A and 13B from an on state to an off state and switches the switch 13C from an off state to an on state.

Next, when a predetermined period of time elapses from the timing of t2 (at a timing of t3), the slope circuit 13 switches the switch 13C from an on state to an off state.

In a period from the timing of t2 to the timing of t3, information of a current flowing through the MOS transistor Q2 is stored in the form of a charging voltage of the capacitor 13E and the slope voltage $V_{SLP}$ increases with increase in the charging voltage of the capacitor 13E.

In addition, after the timing of t2, the capacitor 13F is charged with an output current of the constant current source 13G. Thus, after the timing of t2, a first ramp voltage component which increases with a constant rate of increase according to the output current of the constant current source 13G (constant slope according to the output current of the constant current source 13G) is included in the slope voltage $V_{SLP}$.

Then, when the slope voltage $V_{SLP}$ reaches an error signal $V_{ERR}$ (at a timing of t4), since the reset signal RESET is switched from the low level to the high level, the first switch voltage $V_{SW1}$ is switched from the high level to the low level.

In the above operation, when the battery voltage $V_{BAT}$ as the input voltage is decreased, the slope voltage $V_{SLP}$ does not reach an error signal $V_{ERR}$ (i.e., the reset signal RESET is not switched from the low level to the high level) and the next set signal SET is switched from a low level to a high level (a timing of t5 shown in FIG. 6).

At the timing of t5, the gate signal G1 has the high level at the time of switching of the set signal SET from the low level to the high level. Therefore, an operation after the timing of t5 will be different from the above operation. A case where the gate signal G1 has the high level at the time of switching of the set signal SET from the low level to the high level will now be described with reference to FIG. 6.

At the timing t5, the slope circuit 13 switches the switch 13D from an off state to an on state and keeps the switches 13A to 13C off. Thus, after the timing of t5, a second ramp voltage component which increases with a constant rate of increase according to the output current of the constant current source 13H (constant slope according to the output current of the constant current source 13H) is included in the slope voltage $V_{SLP}$. In addition, the output current of the constant current source 13H is set to be smaller than the output current of the constant current source 13G. Therefore, the slope of the second ramp voltage becomes smaller than the slope of the first ramp voltage.

Thereafter, at the time of switching of the internal clock signal CLK from the high level to the low level (at a timing of t6), the slope circuit 13 switches the switch 13B from an off state to an on state, keeps the switches 13A and 13C off, and keeps the switch 13D on. Thus, only the capacitor 13F is refreshed and the information of the current flowing through the MOS transistor Q2 which is stored in the form of charging voltage of the capacitor 13E is held.

Then, when a predetermined period of time elapses from the timing of t6 (at a timing of t7), the slope circuit 13 switches the switch 13B from an on state to an off state, keeps the switch 13A and 13C in an off state, and keeps the switch 13D in an on state.

After the timing of t7, the slope voltage $V_{SLP}$ is a voltage obtained by combining an offset voltage component corresponding to the information of the current flowing through the MOS transistor Q2 which is held in the capacitor 13E, the first ramp voltage component and the second ramp voltage component.

As the slope voltage $V_{SLP}$ includes the second ramp voltage component, a peak value of the slope voltage $V_{SLP}$ after the timing of t7 can be sequentially increased (in FIG. 6, a value of second peak P2 appearing after the timing of t7 is larger than a value of first peak P1 appearing after the timing of t7). Thus, it is possible to approach the slope voltage $V_{SLP}$ to the error signal $V_{ERR}$ step by step every period of the set signal SET.

Then, when the slope voltage $V_{SLP}$ reaches the error signal $V_{ERR}$ (at a timing of t8), since the reset signal RESET is switched from the low level to the high level, the first switch voltage $V_{SW1}$ is changed from the high level to the low level.

After the reset signal RESET is switched from the low level to the high level, the switch 13A is switched in an on state only once in accordance with the switch 13B. That is, the capacitors 13E and 13F are refreshed. Then, after the reset signal RESET is switched from the low level to the high level, the switch 13A is switched in an on state only once while the switch 13B is switched from an on state to an off state. That is, the information of the current flowing through the MOS transistor Q2 is stored in the form of charging voltage of the capacitor 13E.

When the battery voltage $V_{BAT}$ as the input voltage is further decreased, the step-down mode is switched to the step-up/down mode. The step-up/down mode performs the same operation as in the case of the timing chart shown in FIG. 6 except that the second switch voltage $V_{SW2}$ is switched at a fixed duty ratio since the gate signal G1 has the high level at the time of switching of the set signal SET from the low level to the high level (see FIG. 7).

According to the above-described method of generating the slope voltage $V_{SLP}$, when the battery voltage $V_{BAT}$ as the input voltage is decreased in the step-down mode, it is possible to make the period of the first switch voltage $V_{SW1}$ longer than the period of the set signal SET. This makes it possible to set the maximum on-duty ratio of the first switch voltage $V_{SW1}$ to be larger compared with a case that the period of the first switch voltage $V_{SW1}$ is equal to the period of the set signal SET. Therefore, when the battery voltage $V_{BAT}$ as the input voltage is decreased, it is possible to prevent the switching from the step-down mode to the step-up/down mode.

According to the above-described method of generating the slope voltage $V_{SLP}$, since the current information of the inductor L1 is reflected to the offset voltage of the slope voltage $V_{SLP}$, the slope of the slope voltage $V_{SLP}$ does not depend on the slope of the current of the inductor L1. In current mode control, since it is sufficient if information on an average current of the inductor L1 is fed back, it is not necessary to feed back the slope of the current of the inductor L1. Therefore, according to the above-described method of generating the slope voltage $V_{SLP}$, the slope of the slope voltage $V_{SLP}$ can maintain its linearity regardless of the slope of the current of the inductor L1, thereby making the current mode control easy.

According to the above-described method of generating the slope voltage $V_{SLP}$, the timing at which the MOS transistor Q1 is switched from an off state to an on state (the timing at which the first switch voltage $V_{SW1}$ is switched from the low level to the high level) coincides with the timing at which the MOS transistor Q3 is switched from an on state to an off state (the timing at which the second switch voltage $V_{SW2}$ is switched from the low level to the high level). This makes it possible to flatten the slope of the current of the inductor L1 in a period where the current information of the inductor L1 is captured (the period from the timing of t2 to the timing of t3). Thus, since the information on the average current of the inductor L1 being fed back does not depend on the slope of the current of the inductor L1, it is possible to more reliably feedback the information on the average current of the inductor L1.

Here, as a comparative example, a case where current mode control is performed by detecting a current flowing through the MOS transistor Q1 will be described.

Figure 8:
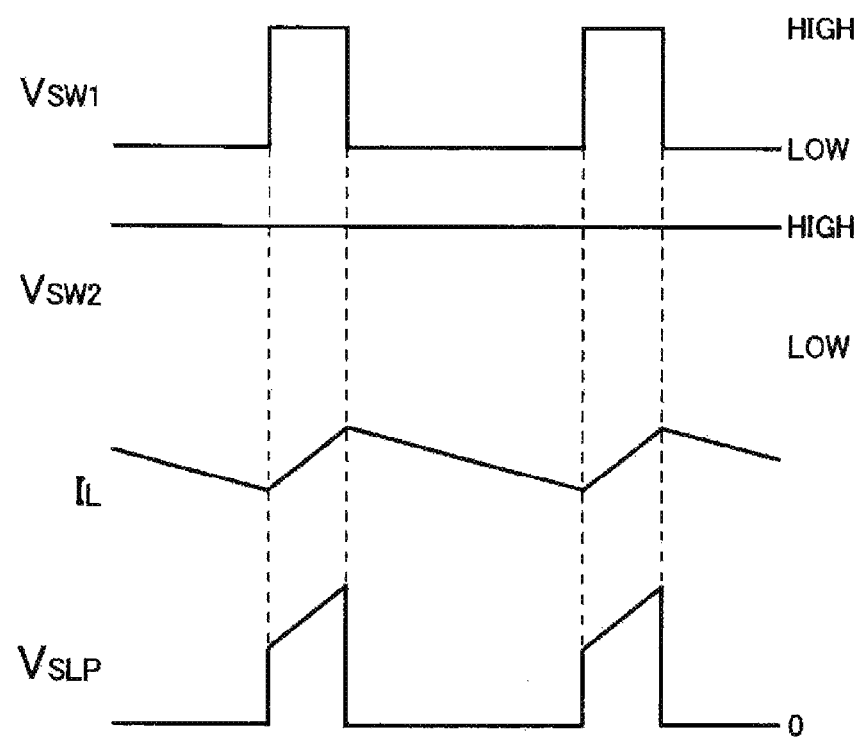
FIG. 8 is a time chart illustrating one operation example of a switching regulator according to a comparative example in a step-down mode.
Figure 9:
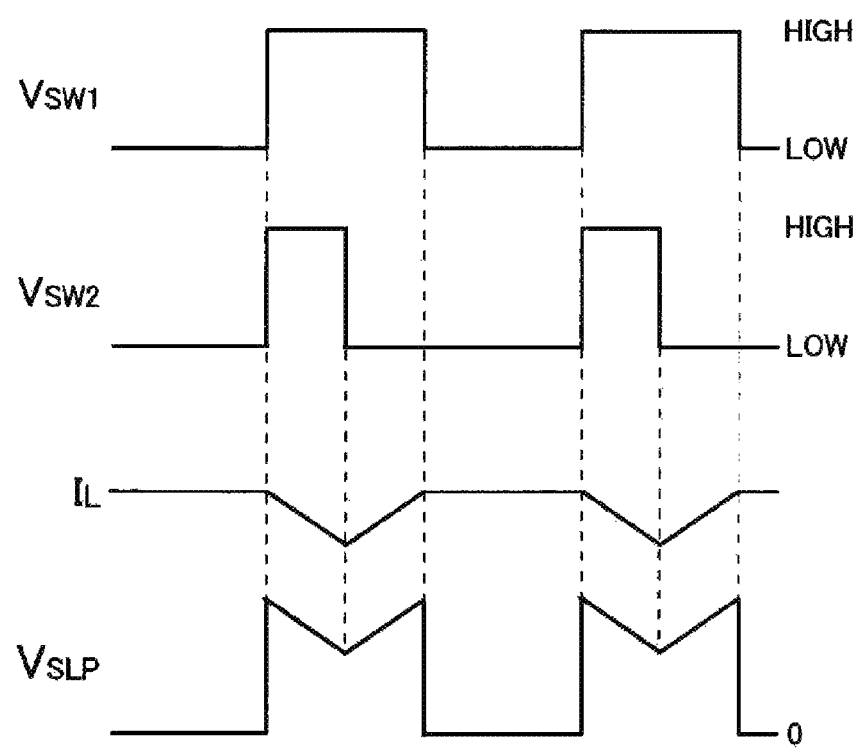
FIG. 9 is a time chart illustrating one operation example of the switching regulator according to the comparative example in a step-up/down mode in a case where a battery voltage is lower than an output voltage.
Figure 10:
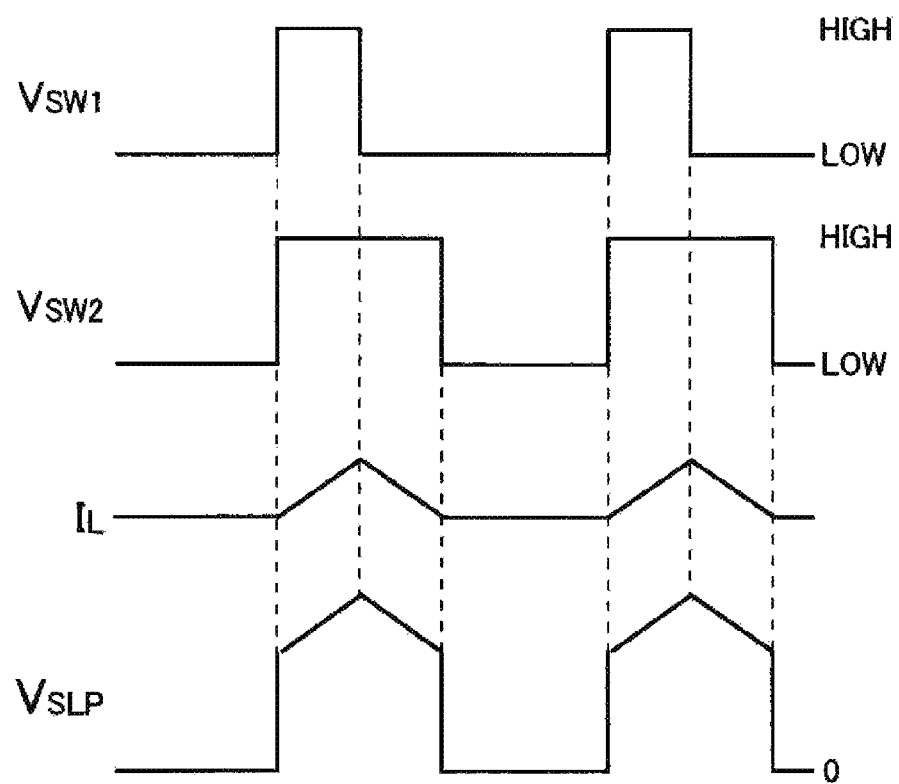
FIG. 10 is a time chart illustrating one operation example of the switching regulator according to the comparative example in the step-up/down mode in a case where the battery voltage is higher than the output voltage.

FIG. 8 is a time chart illustrating one operation example of a switching regulator according to a comparative example in a step-down mode. FIG. 9 is a time chart illustrating one operation example of the switching regulator according to the comparative example in a step-up/down mode in a case where a battery voltage $V_{BAT}$ is lower than an output voltage $V_{OUT}$. FIG. 10 is a time chart illustrating one operation example of the switching regulator according to the comparative example in the step-up/down mode in a case where the battery voltage $V_{BAT}$ is higher than the output voltage $V_{OUT}$.

In the comparative example, the slope of the current of the inductor L1 appears, as it is, in the slope of the slope voltage $V_{SLP}$. In the step-down mode, since the slope of the slope voltage $V_{SLP}$ has the linearity, there is no difficulty in the current mode control. However, in the step-up/down mode, since the slope of the slope voltage $V_{SLP}$ has no linearity, it is difficult to raise a reset signal at a desired timing based on the slope voltage $V_{SLP}$, thereby making the current mode control difficult.

As is apparent from the above description, the switching regulator 101 can perform the current mode control more easily than the switching regulator according to the above-described comparative example.

<Operation Mode>

Here, as an example of switching of the operation mode, a case where the mode designating signal S1 has a high level when the on-duty ratio of the MOS transistor Q1 is equal to or larger than a threshold TH and has a low level when the on-duty ratio of the MOS transistor Q1 is smaller than the threshold TH will be described.

Figure 11:
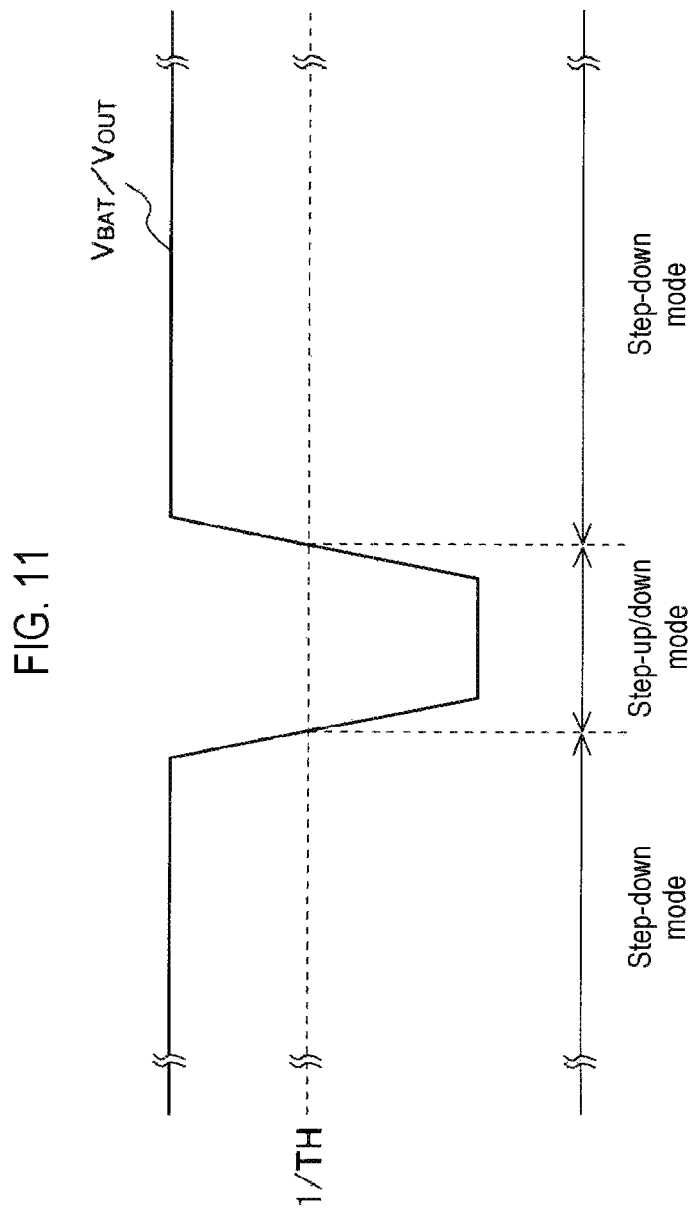
FIG. 11 is a schematic waveform diagram of the ratio of a battery voltage to an output voltage.

When the ratio of the battery voltage $V_{BAT}$ to the output voltage $V_{OUT}$ is larger than the reciprocal of the threshold TH, the switching regulator 101 operates in the step-down mode (see FIG. 11). In the step-down mode, since the step-down control circuit 1 turns on/off the MOS transistors Q1 and Q2 in response to the feedback voltage $V_{FB}$ and the mode designating signal S1 has the low level, the MOS transistor Q3 is held in an off state and the MOS transistor Q4 is held in an on state.

In addition, the overall transfer characteristic of the switching regulator 101 in the step-down mode is expressed by the following equation (1), $$\Delta V_{OUT}/\Delta V_C = (R/R_S) \cdot (1/(1+R \cdot C \cdot s)) \quad (1)$$

Where, $V_C$ is an output voltage of the error amplifier 11, R is the resistance of the output resistor RO, $R_S$ is a current sense gain and C is the capacitance of the output capacitor C1.

On the other hand, when the ratio of the battery voltage $V_{BAT}$ to the output voltage $V_{OUT}$ is equal to or smaller than the reciprocal of the threshold TH, the switching regulator 101 operates in the step-up/down mode (see FIG. 11). In the step-up/down mode, since the step-down control circuit 1 turns on/off the MOS transistors Q1 and Q2 in response to the feedback voltage $V_{FB}$ and the mode designating signal S1 has the high level, the MOS transistors Q3 and Q4 are turned on/off complementarily in a state where the on-duty ratio D (0≤D≤1) of the MOS transistor Q3 is fixed at a fixed value D' (0<D'<1). In addition, in the step-up/down mode, the on-duty ratio of the MOS transistor Q3 is set independent of the output voltage $V_{OUT}$ and the battery voltage $V_{BAT}$.

The fixed value D' may be set to be equal to or smaller than 0.7. This makes it possible to sufficiently suppress a variation of the output voltage $V_{OUT}$ in the step-up/down mode. Further, it is possible to ensure that the output voltage $V_{OUT}$ becomes 5[V] even when the battery voltage $V_{BAT}$ drops to 2[V] with a margin of 10% taking various deviations into account. That is, 0.7 is a numerical value which can be obtained from the equation, 0.1+(5[V]−2[V])/5[V].

In addition, the overall transfer characteristic of the switching regulator 101 in the step-up/down mode is expressed by the following equation (2), $$\Delta V_{OUT}/\Delta V_C = (R/R_S) \cdot (1-D') \cdot (1/(1+R \cdot C \cdot s)) \quad (2)$$

Where, $V_C$ is an output voltage of the error amplifier 11, R is the resistance of the output resistor RO, $R_S$ is a current sense gain, C is the capacitance of the output capacitor C1 and D' is the on-duty ratio of the MOS transistor Q3 (fixed value).

Figure 12:
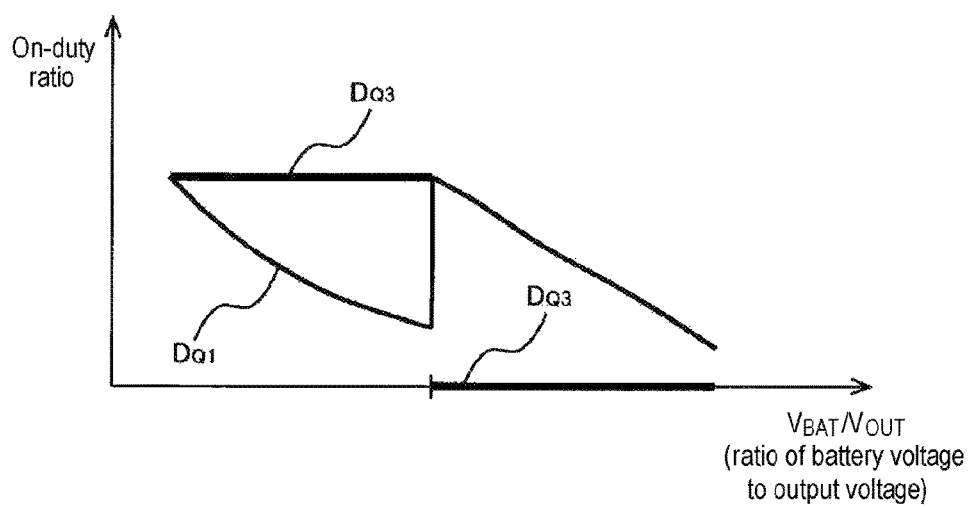
FIG. 12 is a diagram illustrating on-duty ratios of MOS transistors Q1 and Q3.

FIG. 12 illustrates the on-duty ratio $D_{Q1}$ of the MOS transistor Q1 and the on-duty ratio $D_{Q3}$ of the MOS transistor Q3 according to the step-down operation in the step-down mode and the step-up/down operation in the step-up/down mode.

From the above equations (1) and (2), the overall transfer characteristic of the switching regulator 101 in the step-up/down mode is equal to the product of (1−D') and the overall transfer characteristic of the switching regulator 101 in the step-down mode. As a result, the response characteristic of the switching regulator 101 in the step-up/down mode is the same as the response characteristic of the switching regulator 101 in the step-down mode. Therefore, the transfer function of the switching regulator 101 in the step-up/down mode has no right-half-plane-zero characteristic. This eliminates a need to provide an output capacitor C1 with large capacitance, thereby reducing a cost for an output capacitor.

Figure 15:
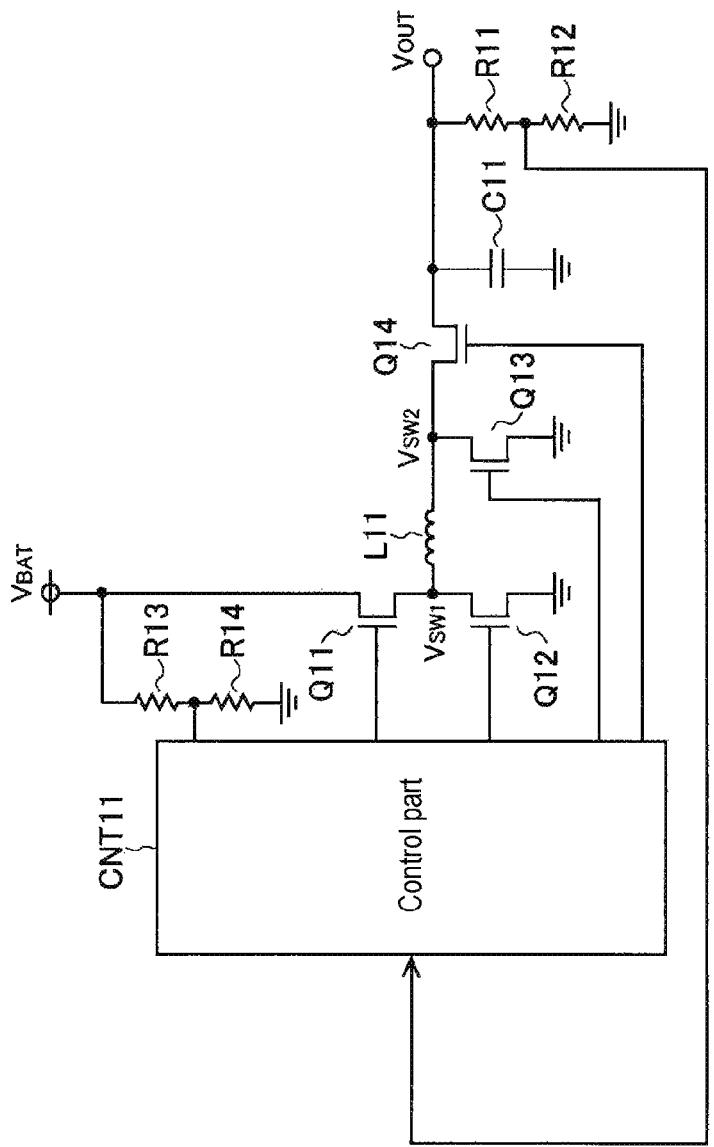
FIG. 15 is a diagram illustrating the configuration of a typical step-up/down switching regulator.
Figure 16:
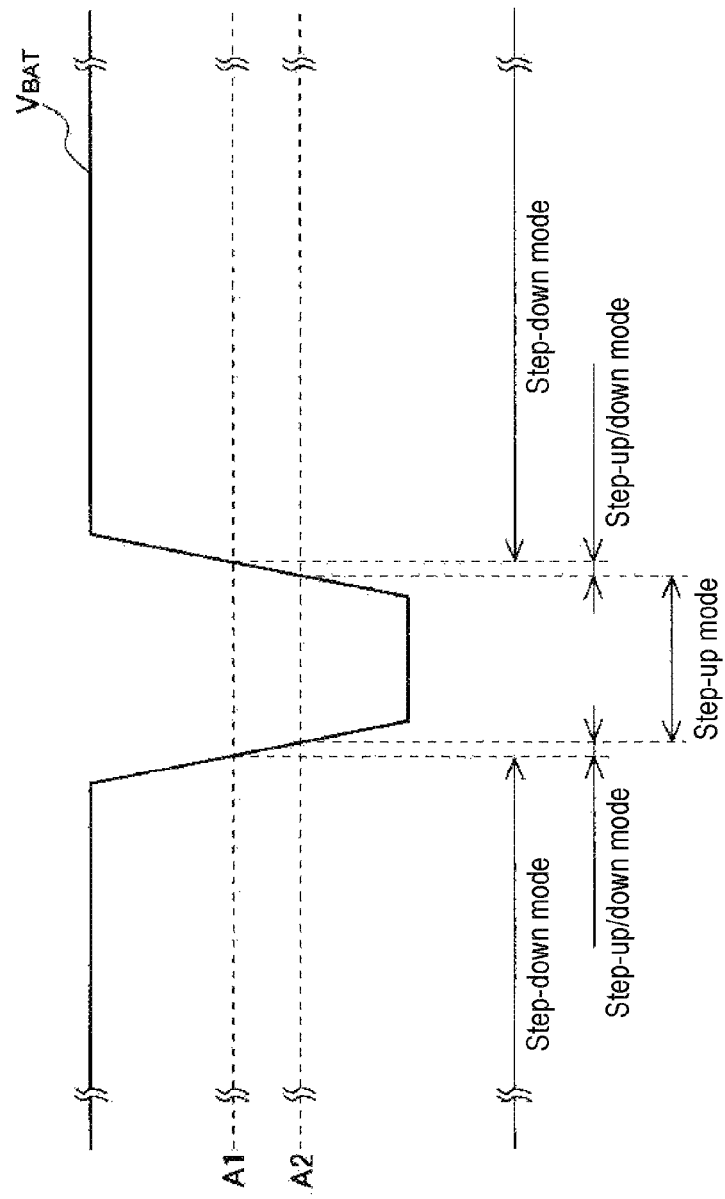
FIG. 16 is a schematic waveform diagram of a battery voltage.
Figure 17A:
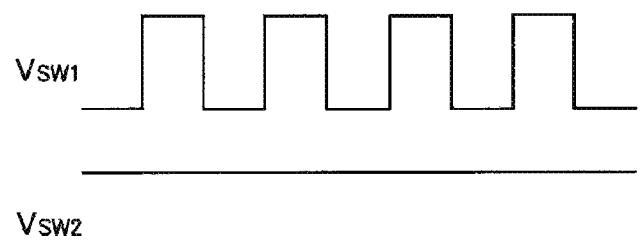
FIG. 17A is a schematic waveform diagram of each switch voltage in a step-down mode.
Figure 17B:
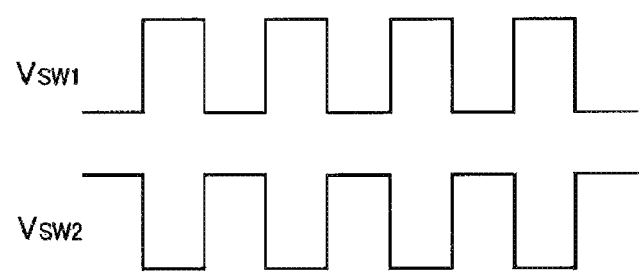
FIG. 17B is a schematic waveform diagram of each switch voltage in a step-up/down mode.
Figure 17C:
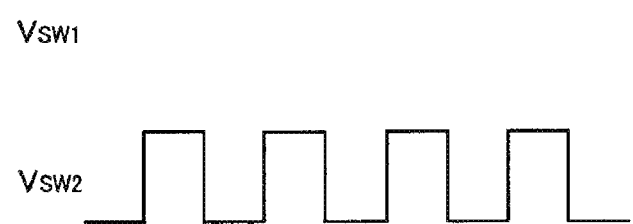
FIG. 17C is a schematic waveform diagram of each switch voltage in a step-up mode.

In addition, since the switching regulator 101 is not a configuration requiring separate reactors for a step-up switching regulator part and a step-down switching regulator part, respectively, it is possible to reduce a cost for a reactor. In addition, in the above example of switching of the operation mode, the step-up/down mode and the step-down mode are switched depending on whether or not the ratio of the battery voltage $V_{BAT}$ to the output voltage $V_{OUT}$ is equal to or smaller than the reciprocal of the threshold TH. In contrast, the typical step-up/down switching regulator shown in FIG. 15 switches the step-up/down mode or step-up mode and the step-down mode depending on whether or not the battery voltage $V_{BAT}$ is equal to or smaller than the first predetermined value A1. The typical step-up/down switching regulator shown in FIG. 15 has a problem that the optimal value of the first predetermined value A1 is changed by setting of the output voltage $V_{OUT}$. In contrast, in the switching regulator 101, since the optimal value of the threshold TH is not changed even when the setting of the output voltage $V_{OUT}$ is changed, there is no need to change the setting of the threshold TH.

Figure 13C:
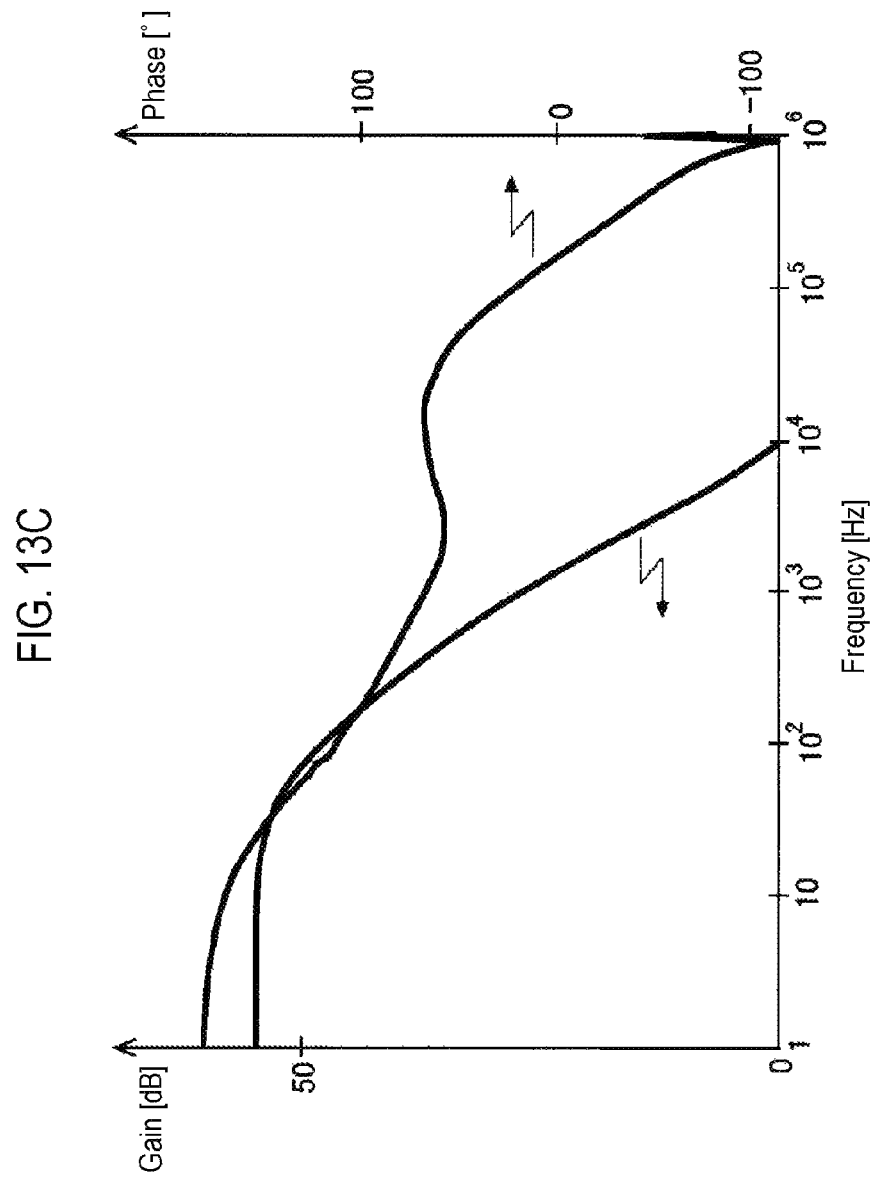
FIG. 13C is a bode diagram of a step-up/down mode after gain correction.

FIGS. 13A and 13B show results of simulation on a bode diagram of the switching regulator 101. FIG. 13A is a bode diagram in a case where the battery voltage $V_{BAT}$ is 12[V] and the output voltage $V_{OUT}$ is 5[V], that is, in the step-down mode. FIG. 13B is a bode diagram in a case where the battery voltage $V_{BAT}$ is 4[V] and the output voltage $V_{OUT}$ is 5[V], that is, in the step-up/down mode. The control system is stable in both of the step-down mode and the step-up/down mode. In addition, by making the product of (1−D') and the gain of the error amplifier 11 in the step-up/down mode equal to the gain of the error amplifier 11 in the step-down mode, it is possible to improve a gain of the step-up/down mode, as shown in FIG. 13C.

<Applications>

Figure 14:
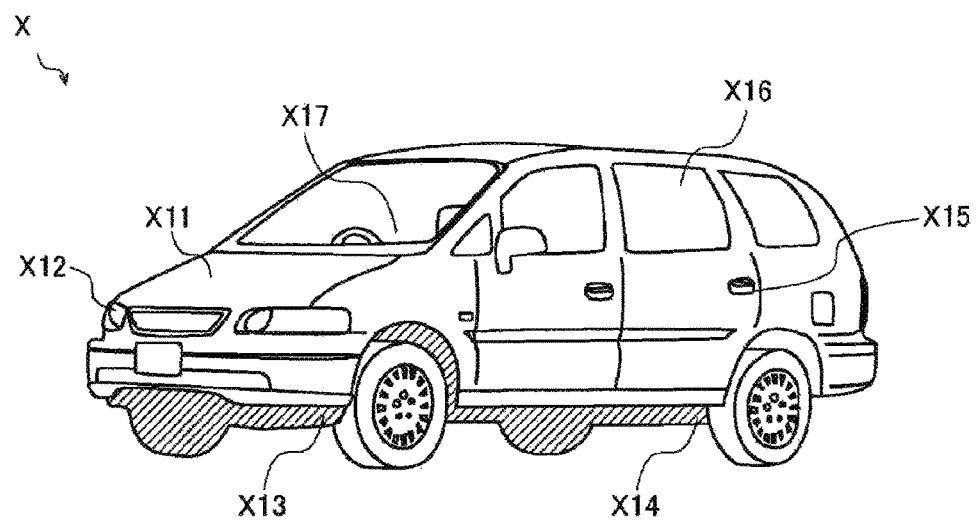
FIG. 14 is an external view illustrating one configuration example of a vehicle equipped with in-vehicle equipment

Next, applications of the above-described switching regulator 101 will be described by way of examples. FIG. 14 is an external view illustrating one configuration example of a vehicle equipped with in-vehicle equipment. In this configuration example, a vehicle X includes a battery (not shown), a primary switching regulator (not shown) for inputting a DC voltage supplied from the battery, a secondary switching regulator (not shown) for inputting a DC voltage output from the primary switching regulator, and in-vehicle equipment X11 to X17. The above-described switching regulator 101 can be applied to the primary switching regulator.

Each of the in-vehicle equipment X11 to X17 uses one of an output voltage of the primary switching regulator and an output voltage of the secondary switching regulator as a power supply voltage.

The in-vehicle equipment X11 is an engine control unit which performs controls related to an engine (e.g., injection control, electronic throttle control, idling control, oxygen sensor heater control, auto cruise control, etc.).

The in-vehicle equipment X12 is a lamp control unit which controls turning-on/off of HID (High Intensity Discharged lamp), DRL (Daytime Running Lamp), etc.

The in-vehicle equipment X13 is a transmission control unit which performs controls related to a transmission.

The in-vehicle equipment X14 is a body control unit which performs controls related to the motion of the vehicle X (e.g., ABS (Anti-lock Brake System) control, EPS (Electric Power Steering) control, electronic suspension control, etc.).

The in-vehicle equipment X15 is a security control unit which performs drive controls of door lock, security alarm, etc.

The in-vehicle equipment X16 is electronics built in the vehicle X at a factory shipping stage, as standard accessories and maker options such as a wiper, electric door mirror, power window, electric sunroof, electric seat, air conditioner, etc.

The in-vehicle equipment X17 is optional electronics built in the vehicle X by a user, such as an in-vehicle A/V (Audio/Visual) system, car navigation system, ETC (Electronic Toll Collection system), etc.

<Other Modifications>

In addition to the above embodiments, the present disclosure can be modified in various ways without departing from the spirit and scope of the disclosure.

In the above embodiments, even when the gate signal G1 has the high level at the time of switching of the set signal SET from the low level to the high level, the first ramp voltage component and the second ramp voltage component are combined, like when the gate signal G1 has the low level at the time of switching of the set signal SET from the low level to the high level. In contrast, when the gate signal G1 has the high level at the time of switching of the set signal SET from the low level to the high level, once the switch 13B is switched from an off state to an on state (at the timing of t6 shown in FIG. 6), the switch 13B may be kept on. In this case, the output current of the constant current source 13H may be set to be larger than that in the above-described embodiment, and the slope of the second ramp voltage may be set to be larger than that in the above-described embodiment.

In addition, although it has been illustrated in the above embodiments that the battery voltage is used as the input voltage of the switching regulator, the present disclosure is not limited thereto. The input voltage of the switching regulator may be a DC voltage other than the battery voltage.

In addition, the number of fixed values of the on-duty ratio set by the fixed duty circuit 4 may be one or more. When the number of fixed values of the on-duty ratio set by the fixed duty circuit 4 is two or more, one of these fixed values may be selected arbitrarily. This selection may be made either automatically in the switching regulator or manually by a user. Here, an example where this selection is made automatically in the switching regulator will be described. In this example, in the step-up/down mode, whenever it is determined that the on-duty ratio of the MOS transistor Q1 is equal to or larger than the first threshold, the above-mentioned fixed value D' is incremented by one step. In addition, in the step-up/down mode, whenever it is determined that the on-duty ratio of the MOS transistor Q1 is equal to or smaller than the second threshold, the fixed value D' is decremented by one step.

INDUSTRIAL APPLICABILITY

The present disclosure can be applied to step-up/down switching regulators used in all fields (home appliance field, vehicle field, industrial machine field, etc.).

According to the present disclosure in some embodiments, it is possible to provide a step-up/down switching regulator which is capable of preventing transition of a step-down mode to a step-up/down mode when an input voltage drops.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A switching regulator for generating an output voltage from an input voltage, comprising:
    a first switch having a first terminal connected to a first application terminal to which the input voltage is applied;
    a second switch having a first terminal connected to a second terminal of the first switch and a second terminal connected to a second application terminal to which a predetermined voltage lower than the input voltage is applied;
    a current detection part configured to detect a current flowing through the second switch based on a voltage between the first terminal of the second switch and the second terminal of the second switch;
    an inductor having a first terminal connected to a connection node between the first switch and the second switch;
    a third switch having a first terminal connected to a second terminal of the inductor, and a second terminal connected to a third application terminal to which the predetermined voltage is applied;
    a fourth switch having a first terminal connected to a connection node between the inductor and the third switch, and a second terminal connected to a fourth application terminal to which the output voltage is applied;
    a first control circuit configured to generate a step-down control signal to turn on/off the first switch and the second switch complementarily in response to the output voltage; and
    a second control circuit configured to fix an on-duty ratio (D (0≤D≤1)) of the third switch at a fixed value (D'(0<D'<1)) in a step-up/down mode and generate a step-up control signal to turn on/off the third switch and the fourth switch complementarily, wherein the first control circuit includes a slope voltage generation part to generate a slope voltage, and generates the step-down control signal in response to the slope voltage, and wherein the slope voltage generation part switches between a first operation of storing information of the current detected by the current detection part and combining a first ramp voltage to the stored information of the current to generate a first slope voltage as the slope voltage and a second operation of storing information of the current detected by the current detection part and combining a second ramp voltage having a slope smaller than a slope of the first ramp voltage, in addition to or instead of the first ramp voltage, to the stored information of the current to generate a second slope voltage as the slope voltage.

2. The switching regulator of claim 1, wherein the first control circuit includes:

an error amplifier which generates an error signal based on a difference between a voltage according to the output voltage of the switching regulator and a reference voltage;

a comparator which compares the slope voltage and the error signal to generate a reset signal which is a comparison signal;

an oscillator which generates a set signal which is a clock signal having a predetermined frequency; and a timing control circuit which generates the step-down control signal in response to the set signal and the reset signal.

3. The switching regulator of claim 2, wherein the first switch is switched from an off state to an on state by the step-down control signal when the set signal is switched from a high level to a low level, and wherein the slope voltage generation part selects one of the first operation and the second operation depending on a state of the step-down control signal when the set signal is switched from the low level to the high level.

4. The switching regulator of claim 1, wherein the current detection part is a voltage-current conversion circuit which converts a voltage according to the current flowing through the second switch into a current, and wherein the slope voltage generation part includes a first capacitor which is charged with an output current of the voltage-current conversion circuit.

5. The switching regulator of claim 4, wherein the slope voltage generation part further includes a first switch which connects/disconnects a current path extending from an output terminal of the voltage-current conversion circuit to the first capacitor.

6. The switching regulator of claim 4, wherein the slope voltage generation part includes a first reset part which resets a charging voltage of the first capacitor by discharging the first capacitor.

7. The switching regulator of claim 4, wherein the slope voltage generation part includes:

a first constant current source; and a second capacitor which is charged with an output current of the first constant current source.

8. The switching regulator of claim 7, wherein the slope voltage generation part includes a second reset part which resets a charging voltage of the second capacitor by discharging the second capacitor.

9. The switching regulator of claim 7, wherein the slope voltage generation part includes a variable resistor part having on-resistance controlled by a charging voltage of the first capacitor, and wherein the variable resistor part is connected in series to the second capacitor.

10. The switching regulator of claim 7, wherein the slope voltage generation part includes:

a second constant current source; and a second switch which connects/disconnects a current path extending from an output terminal of the second constant current source to the first capacitor, and wherein an output current of the second constant current source is smaller than the output current of the first constant current source.

11. A switching regulator for generating an output voltage from an input voltage, comprising:

a first switch having a first terminal connected to a first application terminal to which the input voltage is applied;

a second switch having a first terminal connected to a second terminal of the first switch and a second terminal connected to a second application terminal to which a predetermined voltage lower than the input voltage is applied;

a current detection part configured to detect a current flowing through the second switch based on a voltage between the first terminal of the second switch and the second terminal of the second switch;

an inductor having a first terminal connected to a connection node between the first switch and the second switch;

a third switch having a first terminal connected to a second terminal of the inductor and a second terminal connected to a third application terminal to which the predetermined voltage is applied;

a fourth switch having a first terminal connected to a connection node between the inductor and the third switch and a second terminal connected to a fourth application terminal to which the output voltage is applied;

a first control circuit configured to generate a step-down control signal to turn on/off the first switch and the second switch complementarily in response to the output voltage; and a second control circuit configured to set an on-duty ratio of the third switch independent of the output voltage and the input voltage in a step-up/down mode and generate a step-up control signal to turn on/off the third switch and the fourth switch complementarily, wherein the first control circuit includes a slope voltage generation part to generate a slope voltage and generates the step-down control signal in response to the slope voltage, and wherein the slope voltage generation part switches between a first operation of storing information of the current detected by the current detection part and combining a first ramp voltage to the stored information of the current to generate a first slope voltage as the slope voltage and a second operation of storing information of the current detected by the current detection part and combining a second ramp voltage having a slope smaller than a slope of the first ramp voltage, in addition to or instead of the first ramp voltage, to the stored information of the current to generate a second slope voltage as the slope voltage.

12. A vehicle comprising:

a switching regulator of claim 1; and a battery which supplies power to the switching regulator.

* * * * *